D. C. BUIE.
HEN'S NEST.
APPLICATION FILED MAY 24, 1912.

1,168,475.

Patented Jan. 18, 1916.
2 SHEETS—SHEET 1.

Witnesses

Inventor
D. C. Buie,
By Victor J. Evans
Attorney

D. C. BUIE.
HEN'S NEST.
APPLICATION FILED MAY 24, 1912.
1,168,475.
Patented Jan. 18, 1916.
2 SHEETS—SHEET 2.
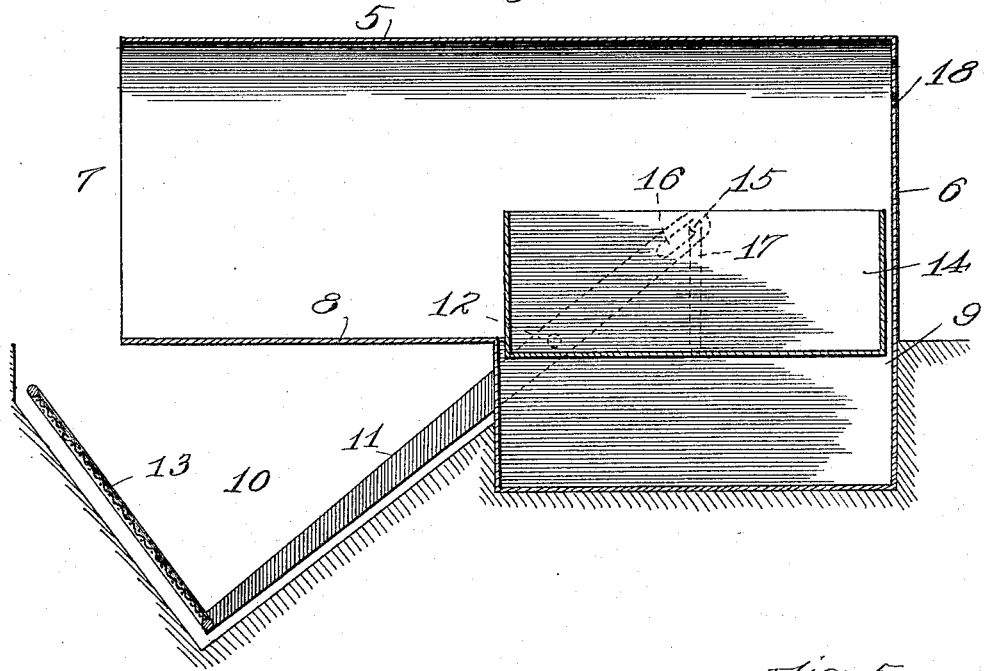
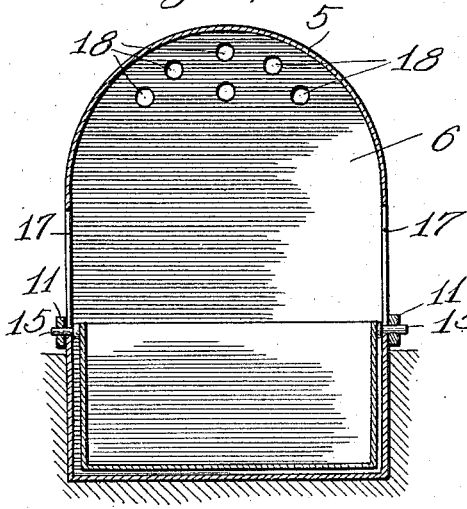
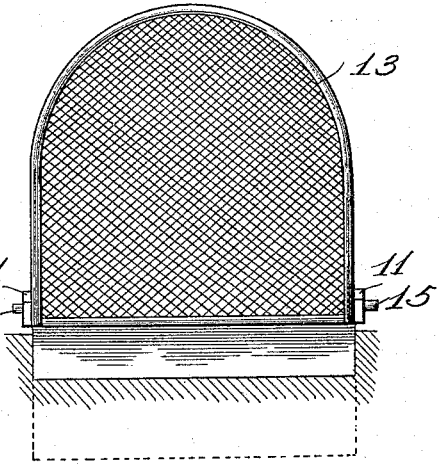
Witnesses
Inventor
D. C. Buie,
By Victor J. Evans
Attorney

UNITED STATES PATENT OFFICE.

DANIEL C. BUIE, OF WILLS POINT, TEXAS.

HEN'S NEST.

1,168,475.  Specification of Letters Patent.  Patented Jan. 18, 1916.

Application filed May 24, 1912. Serial No. 699,423.

*To all whom it may concern:*

Be it known that I, DANIEL C. BUIE, a citizen of the United States, residing at Wills Point, in the county of Van Zandt and State of Texas, have invented new and useful Improvements in Hens' Nests, of which the following is a specification.

The invention relates to nests, and more particularly to the class of hens' nests.

The primary object of the invention is the provision of a hen's nest in which a gate or door will be automatically swung to position for closing the entrance of an inclosure for the nest proper on the entering of a hen in the same, thereby shutting out all intruders, thus avoiding the molesting of the hen when laying an egg, or setting, yet the gate or door will open when the hen leaves the nest for the freedom thereof.

Another object of the invention is the provision of a hen's nest wherein the nest box is connected with a swinging door, so that on the entrance of a hen to the box the latter will lower thereby raising the door for closing the open end of the inclosure for the nest box, and in this manner the hen will be protected from other fowls, and also from animals, owls, hawks, or the like.

A further object of the invention is the provision of a hen's nest in which the door therefor may be locked in either closed or open position, so that the nest can be used and is accessible or closed for disuse as the occasion may require.

A still further object of the invention is the provision of a hen's nest which is simple in construction, automatically operated for the opening and closing thereof, and which is inexpensive in manufacture.

With these and other objects in view the invention consists in the construction, combination and arrangement of parts as will be hereinafter more fully described, illustrated in the accompanying drawings, and pointed out in the claim hereunto appended.

Figure 1:
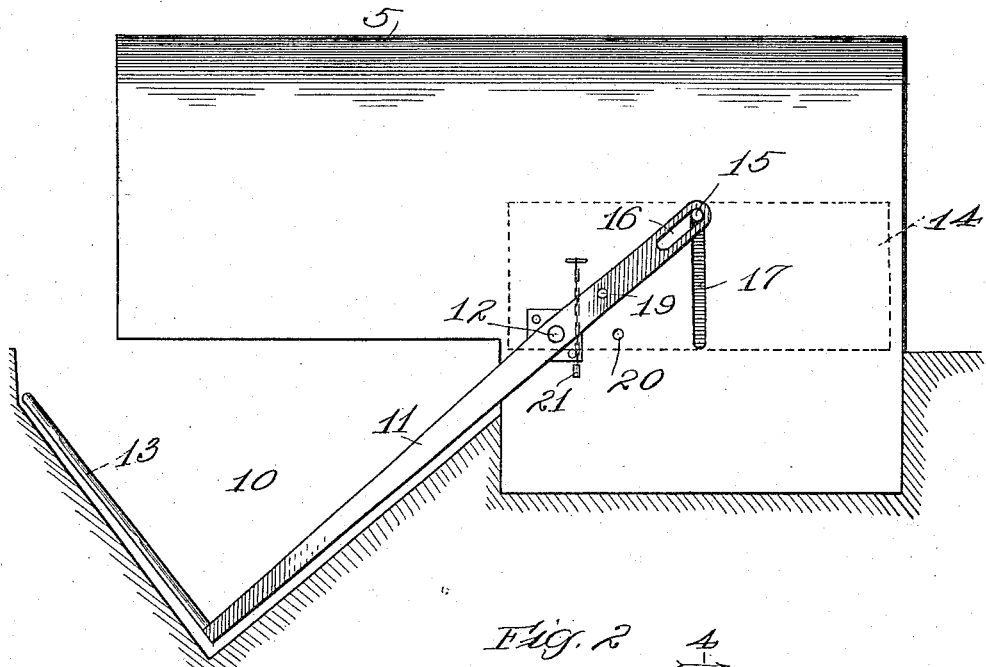
Figure 2:
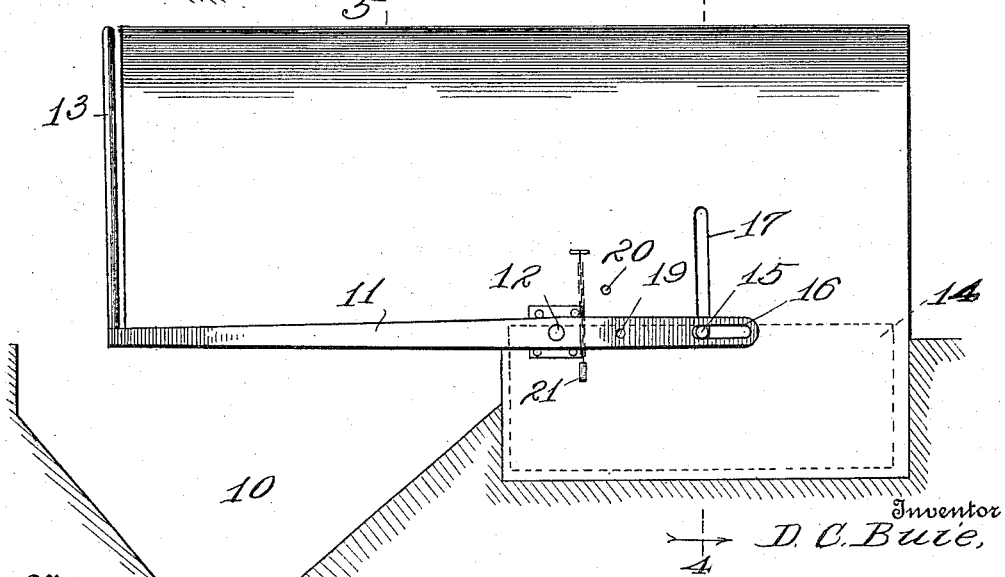

In the drawings: Figure 1 is a side elevation of a nest constructed in accordance with the invention, the same being positioned upon the ground, the latter being excavated to permit the operation of the hen's nest, and is shown in section. Fig. 2 is a similar view showing the door or gate closed. Fig. 3 is a vertical longitudinal sectional view thereof. Fig. 4 is a sectional view on the line 4—4 of Fig. 2. Fig. 5 is a front elevation showing the gate closed.

Similar reference characters indicate corresponding parts throughout the several views in the drawing.

Referring to the drawings by numerals the hen's nest comprises an upwardly arched box-like body 5 preferably constructed from metal although the same may be made from any other suitable material and may be of any other desirable shape and of any size as the occasion may require. The rear end of the body 5 is closed by a rear end wall 6, while its opposite end is open and forms an entrance 7, the bottom of the body 5 being closed for substantially one-half of its length by means of a floor 8 located at the front portion thereof, while the remaining other half of the bottom communicates with a well 9 for receiving a vertically movable nest presently described. This well 9 is closed at its sides, end and bottom and is adapted to be embedded in the ground for the anchoring of the body therein. The body 5 is adapted to be supported at the ground line directly over an excavation forming a cell 10 therein. Arranged at opposite sides of the body 5 are rocking levers 11, the same supported upon pivots 12 engaging the same intermediate the ends thereof, the pivots being mounted upon the sides of the body 5 and projected outwardly therefrom, while fixed to the front ends of the said levers 11 is a foraminous gate or door 13, the same being normally lower in the cell 10 below the floor line of the body 5, but is adapted on the rocking of the levers 11 to close the entrance 7 to the said body, the said levers being operated in a manner presently described. Arranged within the body is a nest comprising a nest box 14, the same being provided at opposite sides thereof with outwardly projecting alining hanger lugs 15, the latter slidably engaging in elongated slots 16 formed in the levers 11 near their rear end, the sides of the body 5 being provided with vertical guide slots 17 through which project the lugs 15 so that the box 14 in its movement will be vertically elevated and lowered through the opening 9 in the bottom of the body 5 on the rocking of the levers 11 for the opening and closing of the gate or door 13. The door or gate 13 is of sufficient weight to normally hold the nest box 14 elevated within the body 5, and to sustain the door in open position, but on the entrance of a hen in the nest box 14, the weight of the said hen will overbalance the weight of the door thereby causing the rocking of the levers 11 and the swinging of the gate or door 13 to closed position over the entrance opening 7 in the front of the body, thus in this manner preventing any intruder from the outside thereof from entering the inclosure when a hen is laying an egg, or setting within the nest box. On the hen leaving the nest box 14 and stepping upon the floor 8 the door or gate 13 will automatically lower in the cell 10 and the nest box will raise at a point elevated above the floor line of the body 5, but when the door or gate 13 is closed and the nest box 14 lowered in the cell 10, the hen occupying the nest box will be protected from molestation by outside intruders.

The hen when leaving the nest box can readily make an exit by means of the door or gate 13 swinging to open position thereby freeing the hen from the body 5 of the nest. The rear wall 6 of the body 5 is provided with ventilating openings 18, so as to permit circulation of air through the said body for sanitary purposes. Formed in one of the levers 11 at opposite sides of the pivot 12 are openings 19 which are adapted to register with openings 20 formed in one side of the body 5 for receiving a locking pin 21 and in this manner the door or gate 13 will be locked in open or closed position if desired.

From the foregoing, taken in connection with the accompanying drawings, it is thought that the construction and operation of the invention will be clearly understood, and therefore, a more extended explanation has been omitted.

What is claimed is:—

A hen's nest comprising a body including a bottom, top, side and rear end walls, said bottom having an opening therein adjacent the rear wall, said side walls from a point approximately intermediate their length, throughout the remaining portion of their length depending below said bottom at the opposite sides of the opening therein, said side walls having alined vertically disposed slots, a nest box arranged within the body for vertical adjustment between said depending portions of the side walls and through said opening in the bottom, lugs projecting from the opposite sides of the box and movable within said slots to guide and limit the adjustments of said box, a pair of levers pivotally mounted exteriorly of the body and having slotted end portions receiving the said lugs, a gate fixed to the outer ends of the levers and adapted to normally lie beneath the plane of the bottom and adapted to be automatically elevated to close the open end of said body on the lowering of the nest box, said lever having an opening adapted to alternately register with spaced openings in the said side walls, and a pin suspended from said body and adapted to pass through said registering openings to lock said gate in either opened or closed position.

In testimony whereof I affix my signature in presence of two witnesses.

DANIEL C. BUIE.

Witnesses:
  Mrs. J. E. BLAKELEY,
  S. T. BLAKELEY.

Copies of this patent may be obtained for five cents each, by addressing the "Commissioner of Patents, Washington, D. C."